(12) United States Patent
Terayoko

(10) Patent No.: US 8,629,906 B2
(45) Date of Patent: Jan. 14, 2014

(54) INSPECTION SYSTEM, MOBILE TERMINAL, INSPECTION METHOD AND RECORDING MEDIUM

(75) Inventor: Hajime Terayoko, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 749 days.

(21) Appl. No.: 12/790,615

(22) Filed: May 28, 2010

(65) Prior Publication Data

US 2010/0302375 A1    Dec. 2, 2010

(30) Foreign Application Priority Data

May 29, 2009 (JP) ................. 2009-131072
Mar. 23, 2010 (JP) ................. 2010-066408

(51) Int. Cl.
*H04N 7/18* (2006.01)
*H04N 5/225* (2006.01)
*G06K 9/00* (2006.01)

(52) U.S. Cl.
USPC ........................................... 348/158

(58) Field of Classification Search
USPC ............................................. 348/158, 333.02
IPC ........................... H04N 7/18,5/225; G06K 9/00
See application file for complete search history.

(56) References Cited

U.S. PATENT DOCUMENTS

| | | | |
|---|---|---|---|
| 5,488,558 A * | 1/1996 | Ohki ........................... | 701/454 |
| 7,107,278 B1 * | 9/2006 | Bandemer ..................... | 1/1 |
| 2005/0086158 A1* | 4/2005 | Clare .......................... | 705/38 |
| 2006/0026009 A1* | 2/2006 | Luhr ........................... | 705/1 |
| 2009/0174768 A1* | 7/2009 | Blackburn et al. ............. | 348/130 |

FOREIGN PATENT DOCUMENTS

| | | |
|---|---|---|
| JP | 7-254020 | 10/1995 |
| JP | 10-25895 | 1/1998 |
| JP | 2002-021327 A | 1/2002 |
| JP | 2002-73740 | 3/2002 |
| JP | 2003-316854 A | 11/2003 |
| JP | 2005-057736 A | 3/2005 |

(Continued)

OTHER PUBLICATIONS

Production Engineering Research Department, Obayashi Corporation Technical Research Institute, "Reinforcement inspection system—supporting reinforcement inspection with mobile terminal and photo management function," URL: http://www.obayashi.co.jp/technology/shoho/pdf/leeflet/3-217.pdf, Apr. 2007.

(Continued)

*Primary Examiner* — Tung Vo
(74) *Attorney, Agent, or Firm* — McGinn IP Law Group, PLLC

(57) ABSTRACT

An inspection method of allowing a mobile terminal to execute: a step of displaying inspection information and drawing information based on an inspection sheet containing inspection information on an inspection object and inspection content and drawing information on the inspection information; a step of selecting a desired inspection object from the inspection objects contained in the inspection sheet according to the displayed drawing information; a step of inputting an inspection result corresponding to the inspection content of the selected inspection object; a step of inputting a shooting point of the selected inspection object; a step of shooting an image by using the inspection object as an object to be shot; and a step of storing inspection result data associating the selected inspection object, the inputted inspection result, the inputted shooting point, and the inspection photo which is the shot image.

16 Claims, 19 Drawing Sheets

(56) References Cited

FOREIGN PATENT DOCUMENTS

| | | |
|---|---|---|
| JP | 2006-092274 A | 4/2006 |
| JP | 2008-146107 | 6/2008 |
| JP | 2009-010634 A | 1/2009 |

OTHER PUBLICATIONS

Notification of Reasons for Rejection dated Aug. 6, 2013 with partial English translation.

\* cited by examiner

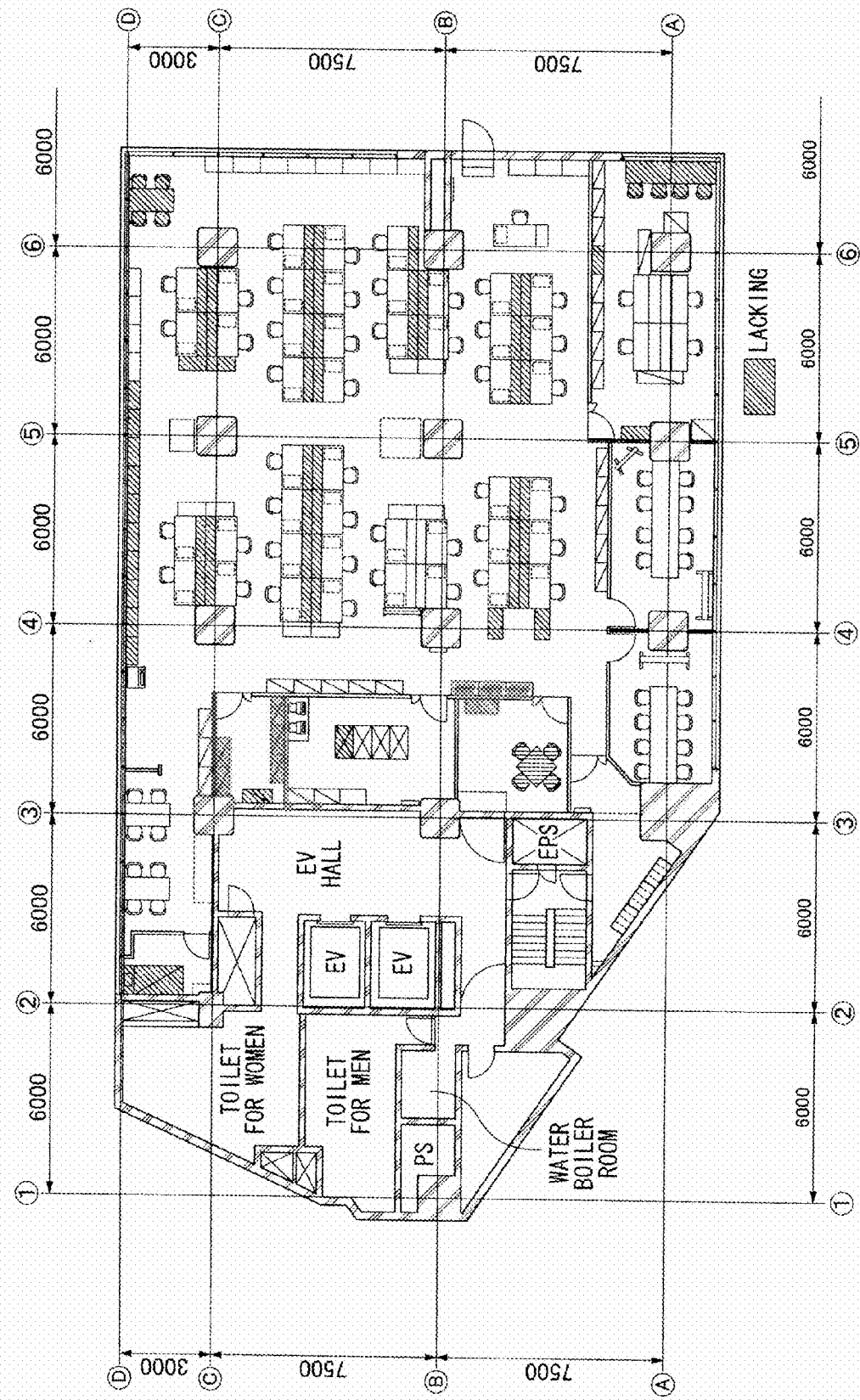

FIG.9

SAMPLE XML FILE

```
1   <?xml version="1.0" encoding="UTF-8" ?>
2 - <inspections xmlns="http://xmlns.fujifilm.jp/isnpection/haikin/0.5" version="0.5">
3   - <inspection type="haikin" id="" name="" floor="" material="post/beam" status="creating/(and more)">
4       <site id="" code="" name="" />
5     - <drawings>
6         <drawing type="original" width="" height="" url="" />
7         <drawing type="whole" width="" height="" file-code="" url="" />
8       - <tiles cols="" rows="">
9           <tile col="" row="" width="" height="" file-code="" url="" />
10      </tiles>
11        <drawing type="section" mark="" width="" height="" file-code="" url="" />
12        <drawing type="note" target="common/(mark)" width="" height="" file-code="" url="" />
13    </drawings>
14  - <inspection-points>
15    - <inspection-point id="1" x="" y="" mark="" address="" status="yet/(and more)" head="true/false">
16      - <inspection-items>
17          <inspection-item id="" name="" type="all/head/visual" result="ok" />
18        - <inspection-item id="" name="" type="all/head/visual" result="ng">
19            <defect type="1/2/3/.../etc" value="" />
20            <repair type="1/2/3/.../etc" value="" />
21            <check timestamp="" user-id="" />
22        </inspection-item>
23      </inspection-items>
24    - <shot-points>
25      - <shot-point id="1-2" x="" y="" direction="LT/(and more)">
26          <photo id="" width="" height="" file-code="" url="" timestamp="" />
27      </shot-point>
28    </shot-points>
29   </inspection-point>
30  </inspection-points>
31 - <logs>
32    <log type="last-update" user-id="" timestamp="" />
33    <log type="new" user-id="" timestamp="" />
34    <log type="create" user-id="" timestamp="" />
35    <log type="recognize" user-id="" timestamp="" />
36    <log type="download" user-id="" timestamp="" />
37    <log type="start" user-id="" timestamp="" />
38    <log type="finish" user-id="" timestamp="" />
39    <log type="upload" user-id="" timestamp="" />
40   </logs>
41  </inspection>
42 </inspections>
```

FIG.10

LINE NUMBER 3 inspection
CONTAINER ELEMENT OF INSPECTION DATA

| ATTRIBUTE | DATA TYPE | VALUE | DESCRIPTION | OMISSION |
|---|---|---|---|---|
| type | string | haikin | TYPES OF INSPECTION. FOR REINFORCEMENT INSPECTION, FIXED TO "haikin". | |
| id | integer | 1 | INSPECTION ID OF INSPECTION PROFILE | |
| name | string | 1F - PILLAR | INSPECTION NAME OF INSPECTION PROFILE | |
| floor | string | B1 | FLOOR OF INSPECTION PROFILE | |
| material | string | post<br>beam | MEMBER OF INSPECTION PROFILE<br>PILLAR: "post" OR BEAM: "beam" | |
| status | string | creating<br>created<br>recognized<br>process<br>reinspection<br>finished<br>completed | INSPECTION STATUS OF INSPECTION PROFILE<br>BEING CREATED: "creating"<br>APPROVAL REQUIRED: "created"<br>UNINSPECTED: "recognized"<br>BEING INSPECTED: "process"<br>REINSPECTION REQUIRED: "reinspection"<br>INSPECTION FINISHED: "finished"<br>COMPLETED: "completed" | |

FIG.11

LINE NUMBER 4 site
ELEMENT INDICATING SITE INFORMATION

| ATTRIBUTE | DATA TYPE | VALUE | DESCRIPTION | OMISSION |
|---|---|---|---|---|
| id | INTEGER | 1 | SITE ID OF SITE INFORMATION | |
| code | STRING | xxcondo | SITE CODE OF SITE INFORMATION | |
| name | STRING | CONDOMINIUM BUILDING XX | SITE NAME OF SITE INFORMATION | |

FIG.12

LINE NUMBER 15 inspection-point
ELEMENT INDICATING INSPECTION POINT INFORMATION

| ATTRIBUTE | DATA TYPE | VALUE | DESCRIPTION | OMISSION |
|---|---|---|---|---|
| id | string | 1-2 | INSPECTION POINT NUMBER | |
| x | integer | 500 | COORDINATE VALUE [pixel] OF INSPECTION POINT IN X DIRECTION. BASE POINT (POINT OF ORIGIN) IS UPPER LEFT (0, 0) OF ORIGINAL DRAWING IMAGE. | |
| y | integer | 500 | COORDINATE VALUE [pixel] OF INSPECTION POINT IN Y DIRECTION. BASE POINT IS UPPER LEFT (0, 0) OF ORIGINAL DRAWING IMAGE. | |
| mark | string | C1A | CODE OF MEMBER | |
| address | string | A1 | BASELINE NUMBER. CHARACTER STRING CONCATENATING BASELINE NUMBERS X AND Y | ENABLED |
| status | string | yet<br>proccess<br>reinspection<br>finished | STATUS OF INSPECTION POINT<br>UNINSPECTED: "yet"<br>UNINSPECTED: "process"<br>UNINSPECTED: "reinspection"<br>INSPECTION FINISHED: "finished" | |
| head | string | ture<br>false | WHETHER OR NOT REPRESENTATIVE MEMBER.<br>* NOT REQUIRED BECAUSE THIS INFORMATION IS NOT SUPPORTED UNDER CURRENT CONDITION. | |

FIG.13

LINE NUMBER 25 shot-point
ELEMENT INDICATING SHOOTING POINT INFORMATION

| ATTRIBUTE | DATA TYPE | VALUE | DESCRIPTION | OMISSION |
|---|---|---|---|---|
| id | integer | 1 | SHOOTING POINT NUMBER | |
| x | integer | 500 | COORDINATE VALUE [pixel] OF SHOOTING POINT IN X DIRECTION. BASE POINT IS UPPER LEFT (0, 0) OF ORIGINAL DRAWING IMAGE. | |
| y | integer | 500 | COORDINATE VALUE [pixel] OF SHOOTING POINT IN Y DIRECTION. BASE POINT IS UPPER LEFT (0, 0) OF ORIGINAL DRAWING IMAGE. | |
| direction | string | LT | SHOOTING DIRECTION. ONLY FOR PILLAR MEMBER | ENABLED |

FIG.14

LINE NUMBER 26 photo
ELEMENT INDICATING INSPECTION PHOTO INFORMATION

| ATTRIBUTE | DATA TYPE | VALUE | DESCRIPTION | OMISSION |
|---|---|---|---|---|
| id | integer | 2 | PHOTO ID OF INSPECTION PHOTO INFORMATION | |
| width | integer | 768 | LATERAL WIDTH OF INSPECTION PHOTO [pixel] | |
| height | integer | 1280 | HEIGHT OF INSPECTION PHOTO [pixel] | |
| file-code | string | 00100110102 | FILE NAME OF INSPECTION PHOTO IN MOBILE PHONE | |
| url | string | http://(hostname)/hi-king/xxcondo/1/result/00100110102.gif | PATH TO INSPECTION PHOTO (SERVER) | |
| timestamp | datetime | 2009/08/21 12:00 | DATE AND TIME WHEN INSPECTION PHOTO WAS SHOT. | |

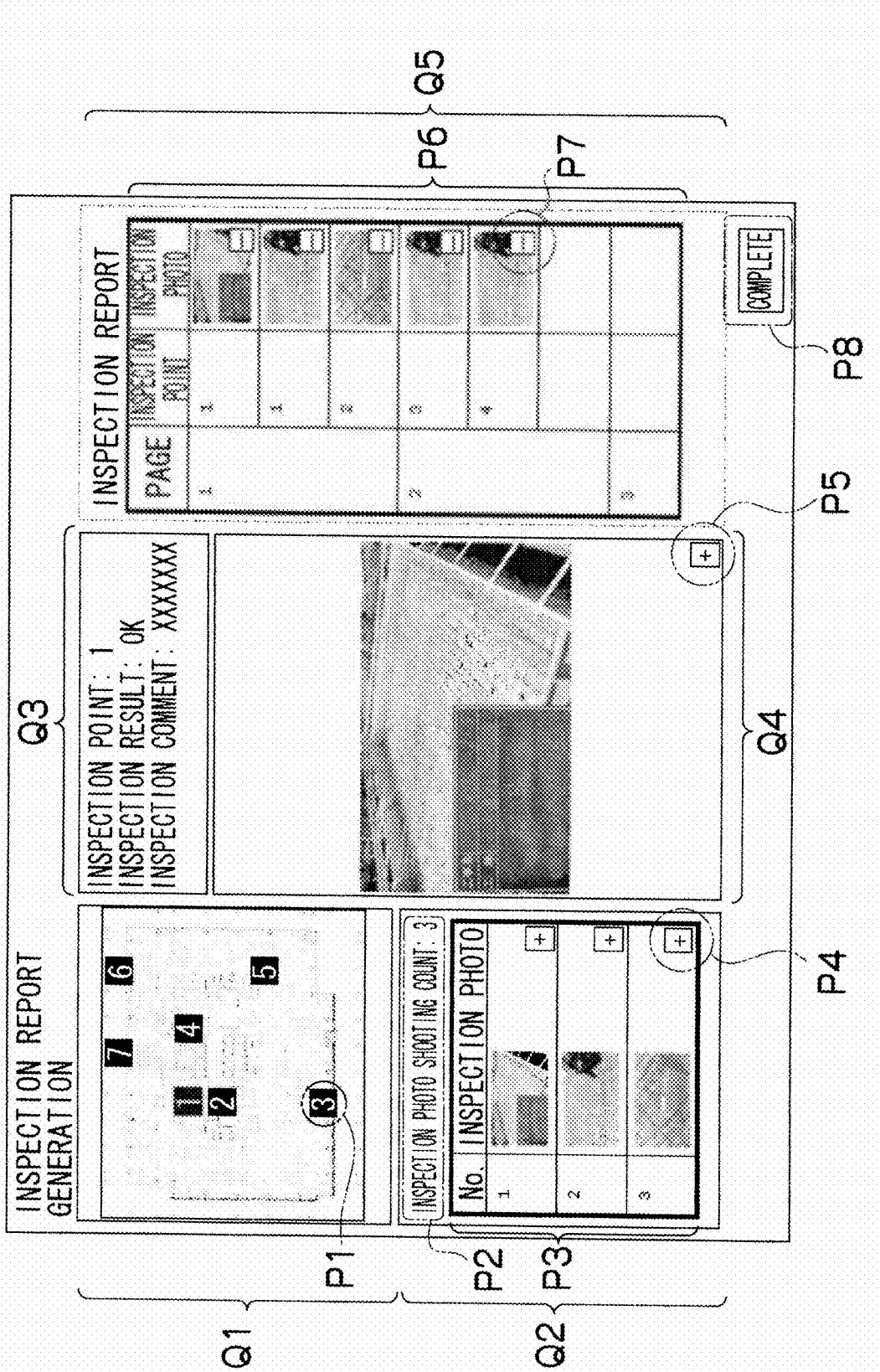

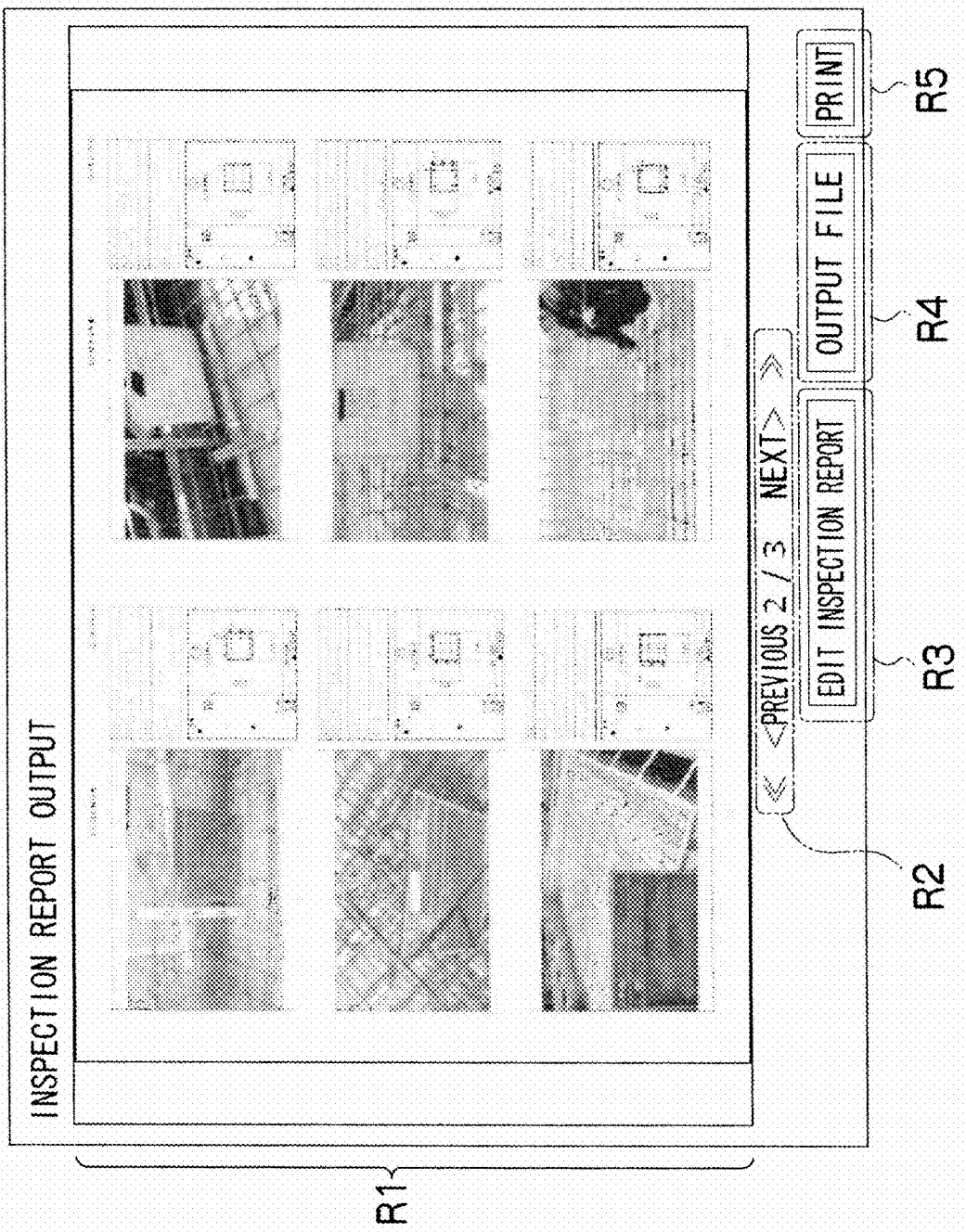

FIG.18A
① VIEW DRAWING
FIG.18B
② SHOOT
FIG.18C
③ STORE WITH ASSOCIATION
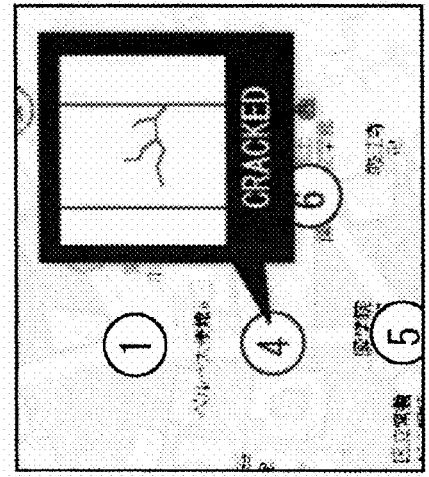
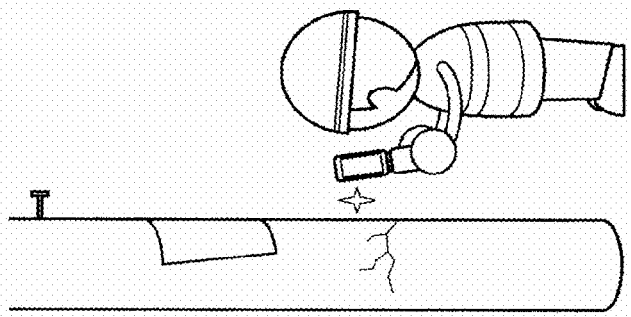
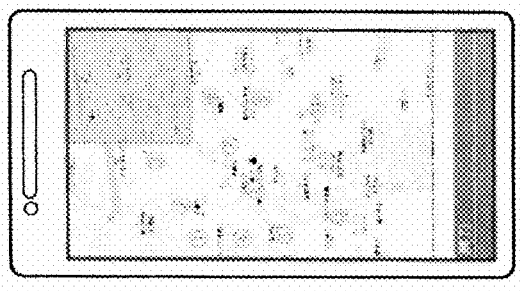

③ DETERMINE AND INSTRUCT

② FIND DEFECT AND REPORT THE FOUND DEFECT

① VIEW DRAWING DATA

INSPECTION SYSTEM, MOBILE TERMINAL, INSPECTION METHOD AND RECORDING MEDIUM

CROSS-REFERENCE TO RELATED APPLICATIONS

This application claims the priority benefit under 35 U.S.C. §119 of Japanese Patent Application No. 2009-131072 filed on May 29, 2009 and Japanese Patent Application No. 2010-066408 filed on Mar. 23, 2010, which are hereby incorporated in their entirety by references.

BACKGROUND OF THE INVENTION

1. Field of the Invention

The presently disclosed subject matter relates to a system supporting a construction inspection work.

2. Description of the Related Art

Conventionally, there has been developed a system for efficiently performing a construction inspection work in a construction site such as a building construction, for example, an inspection called a reinforcement inspection for checking a rebar arrangement state.

Japanese Patent Application Laid-Open No. 2008-146107 discloses a quality management system including: an input device which inputs object information, a construction inspection process, a construction inspection result and a construction progress status and the like; a storage device which stores and manages the inputted information; a communication device which communicates with a server from a terminal such as a PC (Personal Computer) through a communication network; an information processing device which performs careful selection process of a photo to be used as an inspection result, application/approval process of the inspection result, and the like; a display device which can display the inspection result and the construction progress status; and a printing device which can output "a quality audit report".

Japanese Patent Application Laid-Open No. 2002-73740 discloses a mobile terminal device for object inspection which is held by a person in charge of inspection of an object to be constructed. The terminal device includes a position-measuring device (GPS: Global Positioning System) which measures geographical location of the terminal device itself. Site inspection support information is preliminarily downloaded from a host computer to the terminal device. When the person in charge of inspection arrives at the site and starts to inspect the object, the position-measuring device measures the position of the site, automatically retrieves site inspection support information on the corresponding object, and displays the information on the mobile terminal device.

Japanese Patent Application Laid-Open No. 10-25895 discloses a configuration in which an entire construction section drawing of a building stored in an entire construction section storage device is displayed on a liquid crystal display device; a baseline plan drawing stored in an individual baseline drawing storage device is displayed on the liquid crystal display device by touching one of the construction sections on the entire construction section plan drawing with a touch pen; the arrangement location of a reinforcement inspection position is plotted on the baseline plan drawing on the liquid crystal display device by instructing one of the inspection position items with the touch pen; a check item is displayed on the liquid crystal display device by touching any one of the reinforcement inspection positions with the touch pen; and then, a check is made while confirming the reinforcement construction state of the reinforcement inspection position for each check item, and the determination result according to the check result is displayed in the determination column on the check item display screen with the touch pen.

Japanese Patent Application Laid-Open No. 7-254020 discloses a configuration in which a general-purpose PDA (Personal Digital Assistance) is used as an inspection data input apparatus held by a person in charge of inspection; an inspection drawing and inspection master data created and edited by a general-purpose personal computer are downloaded in the PDA; inspection data is inputted to the drawing on the PDA directly with the touch pen; after inspection, inspection data (indicating the failure position, the failure parts, the failure status, and the manufacturer) stored in an IC (Integrated Circuit) memory card of the PDA is processed by the personal computer; and various forms are printed.

Production Engineering Research Department, Obayashi Corporation Technical Research Institute, "Reinforcement inspection system—supporting reinforcement inspection with mobile terminal and photo management function," URL: http://www.obayashi.co.jp/technology/shoho/pdf/leeflet/3-217.pdf, April 2007, discloses a system which displays a reinforcement drawing of inspection places and points to be checked on a PDA; manages reinforcement photos for each inspection place; and creates reports including a key plan, a reinforcement drawing, and a construction photo.

SUMMARY OF THE INVENTION

At actual inspection, there are problems with inspection photo shooting as follows. That is, shooting point information (at which position and in which direction) of an inspection photo to be shot at inspection cannot be preliminarily determined only from a drawing. For this reason, the person in charge of inspection needs to confirm the site situation at inspection and determine the shooting point by his or her own decision before making an entry. In order to ensure the ease of management and credibility of inspection photos, it is necessary to record a shooting point for each inspection photo, and thus a mechanism allowing the person in charge of inspection to input the shooting point information at site in a simple manner is required. Regarding the collaboration between inputting a shooting point from a mobile information terminal and shooting an inspection photo, the conventional technique has not solved the above problem.

The presently disclosed subject matter allows a person in charge of inspection to input shooting point information, shoot an inspection photo, and associate the inspection photo with the shooting point information at site in a simple manner.

The presently disclosed subject matter provides an inspection system including: an inspection sheet generation apparatus; and a mobile terminal, the inspection sheet generation apparatus including: an inspection content input unit which inputs inspection information on an inspection object and inspection content and drawing information on the inspection information; and an inspection sheet generation unit which generates an inspection sheet based on the inspection information and the drawing information inputted by the inspection content input unit, and the mobile terminal including: a display unit which displays the inspection information and the drawing information based on the inspection sheet generated by the inspection sheet generation unit; an inspection object selection unit which selects a desired inspection object from the inspection objects contained in the inspection sheet according to the drawing information displayed on the display unit; an inspection result input unit which inputs an inspection result corresponding to the inspection content of the inspection object selected by the inspection object selection unit; a shooting point input unit which inputs a shooting point of the inspection object selected by the inspection object selection unit; a shooting unit which can shoot an image by using the inspection object as an object to be shot; and a storage unit which stores inspection result data associating the inspection object selected by the inspection object selection unit, the inspection result inputted by the inspection result input unit, the shooting point inputted by the shooting point input unit, and the inspection photo which is an image shot by the shooting unit, with each other.

The inspection system includes an output unit which outputs an inspection report converting inspection result data stored in the storage unit to a predetermined display format or form format.

The inspection system includes a re-inspection unit which instruct a user of the mobile terminal to perform at least one of re-input of an inspection result and re-shooting of the evidence photo according to an inspection result contained in inspection result data stored in the storage unit.

The re-inspection unit displays both an inspection photo contained in inspection result data stored in the storage unit and an angle-of-view confirmation image for confirming angle-of-view obtained from the shooting unit on the display unit.

The inspection system includes a notification unit which notifies a predetermined communication device of the inspection result according to an inspection result contained in inspection result data stored in the storage unit.

The drawing information inputted by the inspection content input unit includes a sketch drawing and a member drawing of an inspection object to which position information on the sketch drawing is assigned, the inspection object selection unit selects an inspection object by specifying the position of an inspection object on the sketch drawing, and the display unit displays the member drawing of the inspection object selected by the inspection object selection unit.

The inspection information inputted by the inspection content input unit includes a pattern of shooting points arranged on the member drawing, and the shooting point input unit inputs a shooting point by causing a desired shooting point to be selected from the pattern of shooting points arranged on the member drawing displayed by the display unit.

The presently disclosed subject matter provides a mobile terminal including: a display unit which displays inspection information and drawing information based on an inspection sheet containing inspection information on an inspection object and inspection content and drawing information on the inspection information; an inspection object selection unit which selects a desired inspection object from the inspection objects contained in the inspection sheet according to the drawing information displayed on the display unit; an inspection result input unit which inputs an inspection result corresponding to the inspection content of the inspection object selected by the inspection object selection unit; a shooting point input unit which inputs a shooting point of the inspection object selected by the inspection object selection unit; a shooting unit which can shoot an image by using the inspection object as an object to be shot; and a storage unit which stores inspection result data associating the inspection object selected by the inspection object selection unit, the inspection result inputted by the inspection result input unit, the shooting point inputted by the shooting point input unit, and the inspection photo which is an image shot by the shooting unit with each other.

The presently disclosed subject matter provides a method of allowing a mobile terminal to execute: a step of displaying inspection information and drawing information based on an inspection sheet containing inspection information on an inspection object and inspection content and drawing information on the inspection information; a step of selecting a desired inspection object from the inspection objects contained in the inspection sheet according to the displayed drawing information; a step of inputting an inspection result corresponding to the inspection content of the selected inspection object; a step of inputting the shooting point of the selected inspection object; a step of shooting an image by using the inspection object as an object to be shot; and a step of storing inspection result data associating the selected inspection object, the inputted inspection result, the inputted shooting point, and the inspection photo which is the shot image.

The presently disclosed subject matter also includes an inspection program for causing a mobile terminal to execute the inspection method. More specifically, the presently disclosed subject matter provides a computer-readable recording medium including instructions stored thereon, such that when the instructions are read and executed by a processor, the processor is configured to perform the steps of: a step of displaying inspection information and drawing information based on an inspection sheet containing inspection information on an inspection object and inspection content and drawing information on the inspection information; a step of selecting a desired inspection object from the inspection objects contained in the inspection sheet according to the displayed drawing information; a step of inputting an inspection result corresponding to the inspection content of the selected inspection object; a step of inputting a shooting point of the selected inspection object; a step of shooting an image by using the inspection object as an object to be shot; and a step of storing inspection result data associating the selected inspection object, the inputted inspection result, the inputted shooting point, and the inspection photo which is the shot image.

According to the presently disclosed subject matter, a series of inspection operations such as inspection sheet generation, inspection result input, inspection photo shooting and form output can be easily performed using an inspection sheet generation apparatus and a mobile terminal. Particularly, inspection point input, inspection result input, and inspection photo shooting or re-shooting can be performed using a mobile terminal, ensuring high portability and operability at inspection site.

BRIEF DESCRIPTION OF THE DRAWINGS

FIG. 8 is a display example of a framing plan;

FIG. 9 is an example of an inspection sheet defined by XML (Extensible Markup Language) tags;

FIG. 10 is an example of a definition of inspection information;

FIG. 11 is an example of a definition of site information;

FIG. 12 is an example of a definition of inspection point information;

FIG. 13 is an example of a definition of shooting point information;

FIG. 14 is an example of a definition of inspection photo information;

FIG. 15 is an example of an inspection report generation screen;

FIG. 16 is an example of an inspection report output screen;

FIGS. 18A to 18C are schematic explanatory drawings of an example of application of this system (inspection and maintenance of a utility pole)

DETAILED DESCRIPTION OF THE PREFERRED EMBODIMENTS

Figure 1:
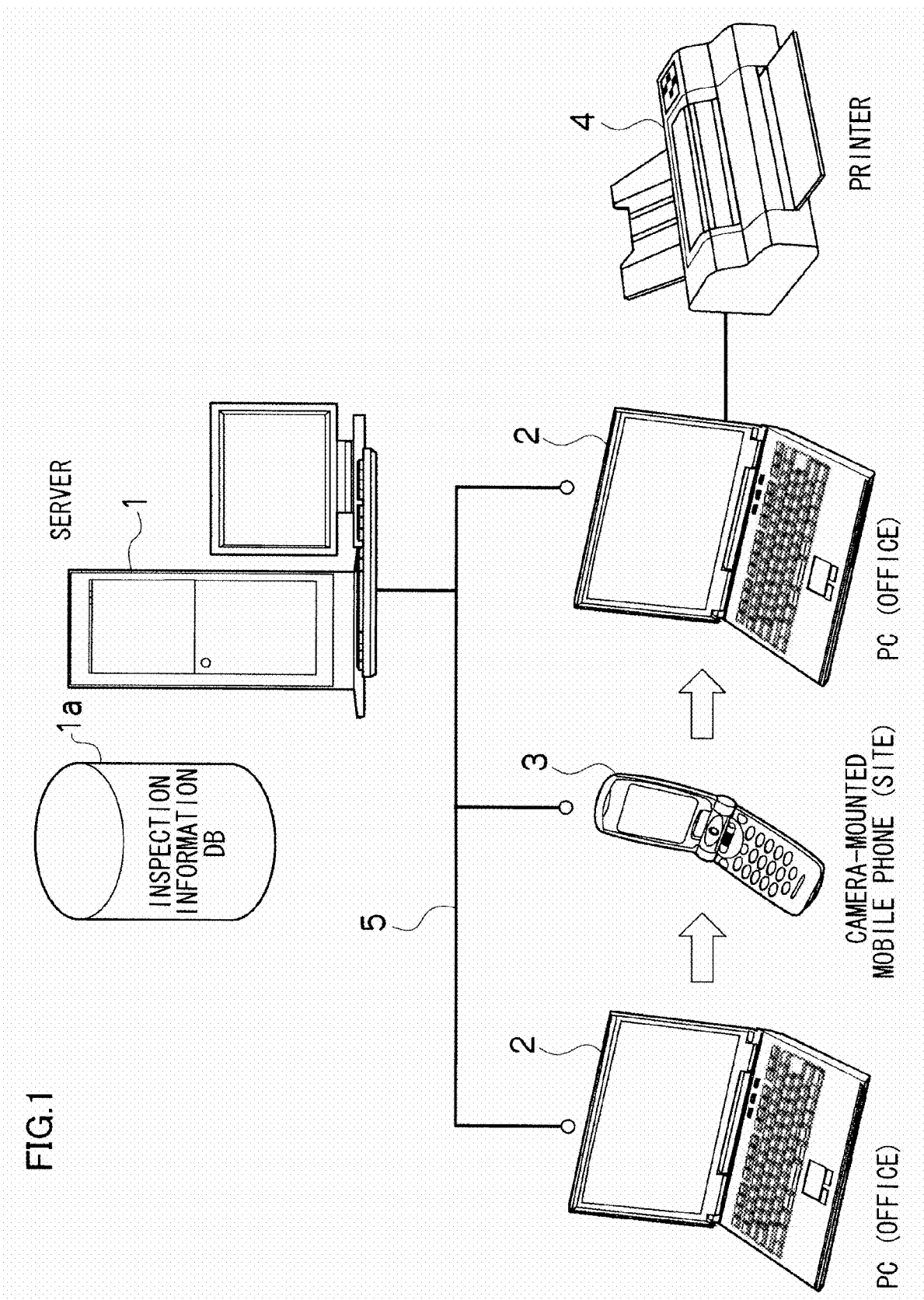
FIG. 1 is a schematic configuration view of an inspection system.

FIG. 1 illustrates a schematic configuration of an inspection system according to a preferred embodiment of the presently disclosed subject matter. The inspection system includes a server 1, personal computers (PC) 2, and a camera-mounted mobile terminal 3. The server 1, the personal computers 2, the camera-mounted mobile terminal 3, and the printer 4 can be connected to each other via a network 5 such as a mobile communication network, the Internet, and a LAN (Local Area Network).

The server 1 has an inspection information DB (database) 1a for centralized management of inspection information. The server 1 and the personal computers 2 each can be configured of a computer (including circuits required for arithmetic operation such as a CPU (Central Processing Unit), a RAM (Random Access Memory) and a ROM (Read-Only Memory), a data storage medium, a data input/output circuit, a display circuit, an operation apparatus and a communication circuit). The inspection information DB 1a can be configured of a large capacity storage medium such as a hard disk unit.

The inspection information stored in the inspection information DB 1a includes a construction object name, an inspection drawing, an inspection type (reinforcement inspection, etc.), an inspection place (a floor number of a building), an inspection object (pillar, beam, wall, etc.), an inspection item (type, number, pitch, etc.) and inspection points (points enclosing a cross section of a pillar from outside, the points arranged in equal distance, etc.). Each inspection drawing includes a sketch drawing (framing plan and side drawing) and a member drawing (reinforcement drawing, sectional drawing, etc.). Each member drawing and inspection object corresponds to a position of each member arranged in the sketch drawing.

In the following description, "any point inspection" refers to a process in which an inspection drawing is displayed on the mobile terminal 3; any inspection place on the inspection drawing is specified; an inspection result and an inspection photo corresponding to the specified inspection place are acquired by the mobile terminal 3; and the inspection result and the inspection photo thereof are associated with each other and stored in a predetermined storage medium (e.g., inspection information DB 1a). On the other hand, "fixed-point inspection" refers to a process in which an inspection drawing is displayed on the mobile terminal 3; any inspection place on the inspection drawing is specified from preliminarily specified inspection places; an inspection result and an inspection photo corresponding to the specified inspection place are acquired by the mobile terminal 3; and the inspection result and the inspection photo thereof are associated with each other and stored in a desired storage medium.

Figure 2:
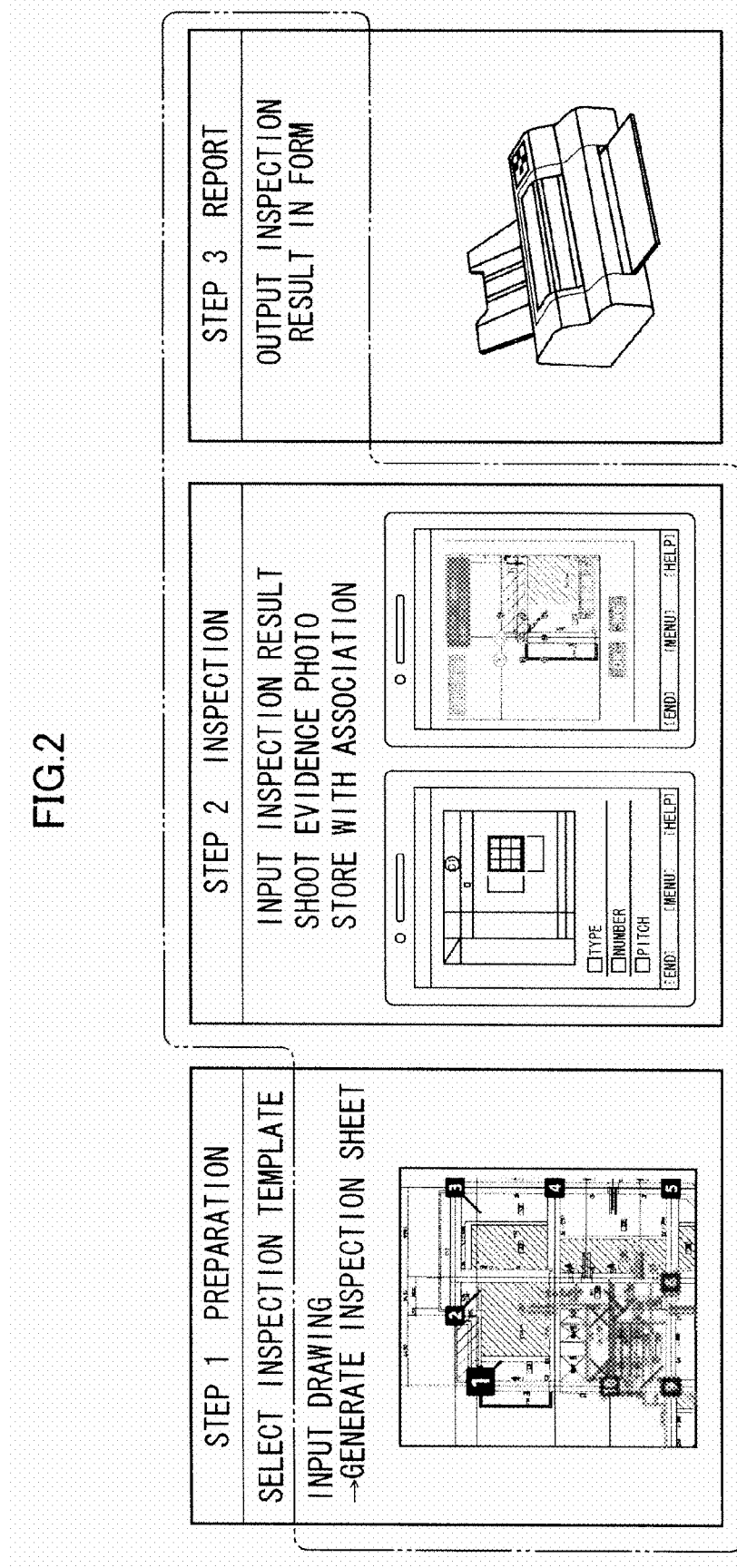
FIG. 2 illustrates an outline of process content of the inspection system.

FIG. 2 illustrates an outline of process content of the inspection system. The inspection system executes inspection sheet generation (Step 1), inspection result input and inspection photo shooting (Step 2), and inspection result output in form (Step 3). The specific flow of these processes will be described later.

Figure 3:
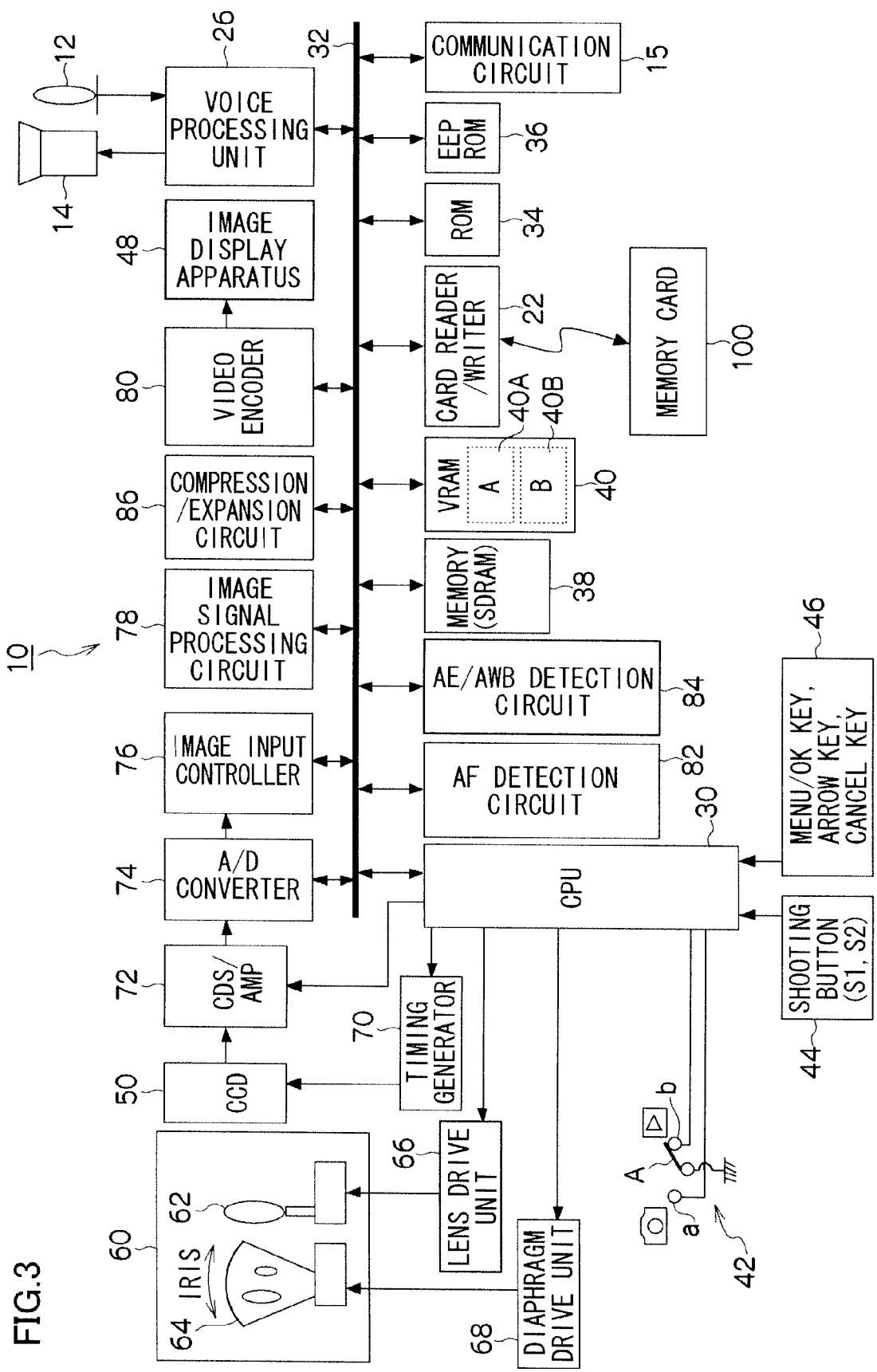
FIG. 3 is a block diagram of a camera-mounted mobile terminal.

FIG. 3 illustrates a configuration of the camera-mounted mobile terminal 3. The entire operation of the camera-mounted mobile terminal 3 is integratedly controlled by a central processing unit (CPU) 30. The CPU 30 functions as a control device which controls the operation according to a predetermined program as well as functions as an arithmetic operation device which performs various arithmetic operations such as an automatic exposure (AE) operation, an automatic focus (AF) adjustment operation, and a white balance (WB) adjustment operation.

Programs to be executed by the CPU 30 and various data required for control are stored in the ROM 34 connected to the CPU 30 via a bus 32. CCD (charge-coupled device) pixel fault information, various constants and information on camera operation are stored in an EEPROM (Electronically Erasable and Programmable Read Only Memory) 36.

A memory (SDRAM: Synchronous Dynamic Random Access Memory) 38 is used as a program load area and an operation work area of the CPU 30 as well as a temporary storage area of image data and voice data. A VRAM (video RAM) 40 is a temporary storage memory dedicated to image data and includes an area A 40A and an area B 40B. The memory 38 and the VRAM 40 can be shared.

The camera-mounted mobile terminal 3 includes a mode selection switch 42, a shooting button 44, and an operation device 46 including a menu/OK key, an arrow key, a cancel key, and the like. Each signal from the various operation units (42 to 46) is inputted to the CPU 30. The CPU 30 controls each circuit of the camera-mounted mobile terminal 3 based on an input signal such as lens drive control, shooting operation control, image processing control, image data recording/reproducing control, and display control of an image display apparatus 48.

The mode selection switch 42 is an operation device for switching between a shooting mode and a reproduction mode. When a movable armature 42A is made to contact a contact point "a" by operating the mode selection switch 42, a corresponding signal is inputted to the CPU 30, and the camera-mounted mobile terminal 3 is set to the shooting mode. When the movable armature 42A is made to contact a contact point "b", the camera-mounted mobile terminal 3 is set to the reproduction mode for reproducing a recorded image.

The shooting button 44 is an operation button for inputting a shooting start instruction and includes a two-stage stroke switch: a switch S1 which is turned on when the switch is half-pressed and a switch S2 which is turned on when the switch is fully-pressed.

The image display apparatus 48 is configured of a liquid crystal display capable of color display. The image display apparatus 48 can be used as an electronic finder for angle-of-view confirmation at shooting as well as is used as a device for reproducing and displaying a recorded image. Moreover, the image display apparatus 48 is also used as a user interface display screen on which information such as menu information, selection items, and setting contents is displayed as needed.

When a shooting mode is selected by the mode selection switch 42, power is supplied to a shooting unit including a color CCD solid imaging element 50 (hereinafter referred to simply as CCD) to enter a shootable state.

The lens unit 60 is an optical unit including a shooting lens 62 having a focus lens and a mechanical shutter 64 also serving as a diaphragm. The lens unit 60 is electrically driven by the lens drive unit 66 and the diaphragm drive unit 68 controlled by the CPU 30 for zoom control, focus control and iris control.

The light transmitted through the lens unit 60 is focused on a light receiving surface of the CCD 50. A large number of photodiodes (light receiving elements) are arranged two-dimensionally on the light receiving surface of the CCD 50. Primary color filters of red (R), green (G), and blue (B) are arranged in a predetermined array structure (such as Bayer and G stripe) corresponding to each photodiode. The CCD 50 has an electronic shutter function to control a charge storage time (shutter speed) of each photodiode. The CPU 30 controls the charge storage time in the CCD 50 through a timing generator 70. Note that the CCD 50 may be replaced with an imaging element in another format such as an MOS (metal-oxide semiconductor) type.

An object image focused on the light receiving surface of the CCD 50 is converted to a signal charge with an amount corresponding to an incident light amount by each photodiode. A signal charge stored in each photodiode is sequentially read as a voltage signal (image signal) corresponding to the signal charge based on a drive pulse supplied from the timing generator 70 in response to an instruction of the CPU 30.

The signal outputted from the CCD 50 is fed into an analog processing unit (CDS/AMP) 72, where each R, G, and B signal of a pixel undergoes sampling hold (correlated double sampling), and after amplification, is fed into an A/D (analog to digital) converter 74. Each dot-sequential R, G, and B signal converted to a digital signal by the A/D converter 74 is stored in a memory 38 via an image input controller 76.

The image signal processing circuit 78 processes the R, G, and B signals stored in the memory 38 in response to an instruction of the CPU 30. That is, the image signal processing circuit 78 functions as an image processing device including a color-interpolating circuit (processing circuit which interpolates a spatial displacement (absence) of a color signal due to a single-plate CCD color filter array), a white balance correction circuit, a gamma correction circuit, a contour correction circuit, a luminance/color-difference signal generation circuit. The image signal processing circuit 78 performs a predetermined signal process while using the memory 38 in response to a command from the CPU 30.

The RGB image data is inputted to the image signal processing circuit 78 which converts the RGB image data to a luminance signal (Y signal) and a color-difference signal (Cr and Cb signals) and performs a predetermined process such as a gamma correction. The image data processed by the image signal processing circuit 78 is stored in the VRAM 40.

When the shooting image is monitor-outputted to an image display apparatus 48, the image data is read from the VRAM 40 and fed into a video encoder 80 via the bus 32. The video encoder 80 converts the inputted image data to a signal in a predetermined system for display (e.g., color composite video signal according to the NTSC (National Television System Committee) system) and outputs the signal to the image display apparatus 48.

In response to an image signal outputted from the CCD 50, image data representing one frame of image is rewritten alternately between an area A 40A and an area B 40B of the VRAM 40. Of the area A 40A and the area B 40B of the VRAM 40, written image data is read from an area other than the area in which image data is rewritten. In this manner, image data is periodically rewritten in the VRAM 40. Shooting video is displayed real-time on the image display apparatus 48 by supplying the image display apparatus 48 with a video signal generated from the image data. The shooter can confirm the shooting angle-of-view by a video image (live view image, through movie image) displayed on the image display apparatus 48.

When the shooting button 44 is half-pressed and 51 is turned on, the mobile terminal 3 starts the AE and AF processes. That is, the image signal outputted from the CCD 50 undergoes an A/D conversion and is inputted to an AF detection circuit 82 and an AE/AWB detection circuit 84 through the image input controller 76.

The AE/AWB detection circuit 84 includes a circuit which divides one screen into a plurality of areas (e.g., 16×16) and integrates an RGB signal for each divided area and provides the CPU 30 with the integrated value. The CPU 30 detects an object brightness (object intensity) based on the integrated value obtained from the AE/AWB detection circuit 84 and calculates an exposure value (shooting EV value) suitable for shooting. According to the obtained exposure value and a predetermined program chart, the diaphragm value and the shutter speed are determined, based on which the CPU 30 obtains an appropriate amount of light exposure by controlling the electronic shutter and the iris of the CCD 50.

At automatic white balance adjustment, the AE/AWB detection circuit 84 calculates an average integrated value of each color of the RGB signals for each divided area and provides the CPU 30 with the calculated result. The CPU 30 obtains an integrated value of R, an integrated value of B, and an integrated value of G, and calculates a ratio of R/G and a ratio of B/G for each area. The CPU 30 determines the light source type based on the distribution of the values of R/G and B/G in the color space of R/G and B/G. According to the white balance adjustment value appropriate for the determined light source type, the CPU 30 sets the value of each ratio, for example, so as to be about 1 (i.e., the integration ratio of RGB in one screen is R:G:B≈1:1:1). Accordingly, the CPU 30 controls the gain value (white balance correction value) to the R, G, and B signals of the white balance adjustment circuit and corrects the signal of each color channel.

Contrast AF for moving a focusing lens (a moving lens, contributing to focus adjustment, of a lens optical system constituting a shooting lens 62) is applied to the AF control of the mobile terminal 3, for example, so that the high-frequency component of the G signal of the video signal becomes a local maximum. That is, the AF detection circuit 82 includes a high-pass filter passing only the high-frequency component of the G signal; an absolute value processing unit, an AF area extraction unit extracting a signal in a focus object area preliminarily set in a screen (e.g., central portion of the screen); and an integration unit integrating absolute value data in the AF area.

Data of the integrated value obtained by the AF detection circuit 82 is fed into the CPU 30. While moving the focusing lens by controlling the lens drive unit 66, the CPU 30 calculates a focus evaluation value (AF evaluation value) at a plurality of AF detection points and determines the lens position in which the evaluation value becomes a local maximum, as the focusing position. Then, the CPU 30 controls the lens drive unit 66 to cause the focusing lens to move to the calculated focusing position. Note that calculation of the AF evaluation value is not limited to the embodiment of using the G signal, but the luminance signal (Y signal) may be used.

When the shooting button 44 is half-pressed and S1 is turned on, the AE/AF process starts. When the shooting button 44 is fully-pressed and S2 is turned on, a shooting operation for recording starts. The image data acquired accordingly when S2 is turned on is converted to a luminance/color-difference signal (Y/C signal) by the image signal processing circuit 78. The luminance/color-difference signal undergoes a predetermined process such as gamma correction and then is stored in the memory 38.

The Y/C signal stored in the memory 38 is compressed in a predetermined format by the compression/expansion circuit 86 and then can be recorded in a memory card 100 through a card reader/writer 22. For example, a still image is recorded in a JPEG (Joint Photographic Experts Group) format.

When the reproduction mode is selected by the mode selection switch 42, compressed data of a final image file (last recorded file) recorded in the memory card 100 is read. When the last recorded file is a still image file, the read compressed image data is expanded to uncompressed YC signals through the compression/expansion circuit 86, converted to display signals through the image signal processing circuit 78 and a video encoder 80, and then outputted to the image display apparatus 48. Thereby, the image content of the file is displayed on a screen of the image display apparatus 48.

While one frame of a still image is being reproduced (including the reproduction of a leading frame of a moving picture), the file to be reproduced can be switched (between forward frame advance and reverse frame advance) by operating the right key or the left key of the arrow keys. An image file at the frame-advanced position is read from the memory card 100, and in the same manner as above, a still image or a moving picture is reproduced and displayed on the image display apparatus 48.

The camera-mounted mobile terminal 3 includes a microphone 12 which inputs a transmitting voice; a speaker 14 which outputs a received voice; a voice processing unit 26 which encodes the voice inputted from the microphone 12 and decodes the received voice; and a communication circuit 15 which communicates voice, images, and other data with the server 1, the PC 2, or other mobile terminal 3 through a mobile communication network.

The camera-mounted mobile terminal 3 can be configured of a well known camera-mounted mobile phone, a camera-mounted PDA, or the like. Note that a circuit related to voice communication may not be needed.

Figure 4:
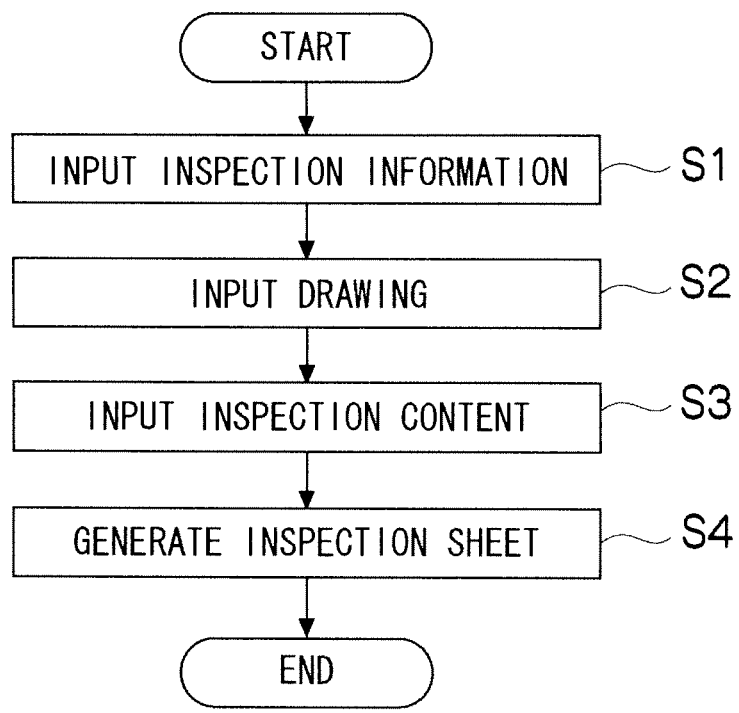
FIG. 4 is a flowchart of an inspection sheet generation process.

FIG. 4 illustrates a flowchart of an inspection sheet generation process. The PC 2 specifies the URL (Uniform Resource Locator) of the server 1 on a web browser to access the server 1 and sends user account information (a combination of ID and password) to the server 1. The server 1 matches the received user account information with the certified user account information preliminarily stored in the DB 1$a$ and, based on the matched result, the server 1 authenticates the PC 2. After the authentication completes, the server 1 starts this process in response to an instruction to the PC 2 (when a dedicated button icon is pressed). A program causing the server 1 and the PC 2 to execute this process is stored in a storage medium of the server 1 and the PC 2.

In step S1, the server 1 sends an inspection information input screen to the PC 2. The PC 2 displays the screen received from the server 1 and accepts an input of inspection information from the screen. The input form of the inspection information is not limited and may include text input by a key board or other operation apparatus or item selection from a list box. For example, the construction object name "AA building", the inspection type "reinforcement inspection", the inspection place "3F", the inspection object member "pillar", and the inspection points "1", . . . , "9" may be inputted. The PC 2 temporarily stores, in the RAM, inspection information inputted from the operation apparatus. A plurality of inspection object members can be inputted.

In step S2, the PC 2 accepts an input of an inspection drawing according to an instruction of the screen. The inspection drawing is an output from a CAD (Computer aided design system) application operating on the PC 2 and other drawings conforming to various standards such as a PDF (Portable Document Format) and jpeg image. The PC 2 may accept a selection of a desired drawing file from the drawings stored in the PC 2 and the selected drawing file may be used as the inspection drawing. The PC 2 temporarily stores the inputted inspection drawing in the RAM.

Moreover, the PC 2 accepts an input of member-related information to the inspection object member inputted in step S1. The member-related information is information specifying a position on an individual member drawing corresponding to the inspection object member and a sketch drawing containing the inspection object member. That is, each inspection object member has its own specific installation position on the sketch drawing and its own specific structure. Therefore, this step reserves member-related information including position information indicating the installation position of each inspection object member on the sketch drawing and a member drawing which is information specifying the structure of each inspection object member.

In step S3, the PC 2 accepts an input of inspection content according to an instruction of the screen. The inspection content is information specifically indicating which item and content is to be checked in this inspection and any data format is accepted. Examples of the inspection content include text data containing characters such as "type", "number", and "pitch"; graphic data of a check box associated with the text data; and a drawing file of a sectional drawing. The PC 2 temporarily stores the inputted inspection content in the RAM.

In step S4, the PC 2 associates the inspection information, the inspection drawing, member-related information, and the inspection content temporarily stored in the RAM and sends the associated information to the server 1.

The server 1 generates an inspection sheet based on the inspection data which is information sent from the PC 2. Specifically, first, the server 1 reads a template preliminarily stored in the inspection information DB 1$a$ based on the inputted inspection information. For example, from the information on the inspection type "reinforcement inspection" and the inspection object member "pillar", the server 1 reads "template for reinforcement inspection of pillar" from the inspection information DB 1$a$. Alternatively, from the information on the inspection type "template for inspection of utility pole" and the inspection object member "utility pole", the server 1 reads "template for inspection of utility pole" from the inspection information DB 1$a$.

The template specifies the arrangement pattern and the display format of the inspection information and the inspection drawing.

The template includes a first link information which allows the construction object name, the inspection type, the inspection place, and the framing plan contained in the inspection information to be referred to each other using a markup language such as XML; second link information which allows the member drawing (sectional drawing) corresponding to each inspection object member contained in the inspection information and position information of each inspection object member on the framing plan to be referred to each other; third link information which allows each inspection object member and the inspection result thereof to be referred to each other; and fourth link information which allows a plurality of inspection photos corresponding to the same inspection place to be referred to each other.

Note that unlike the inspection sheet, no value of inspection data is set in the template. Moreover, unlike the inspection report, no value of inspection result and inspection photo is set in the template.

The server 1 generates the inspection sheet by filling the value of an item (defined by XML tags, etc.) corresponding to inspection data in the read template with inspection data registered from the PC 2.

The sketch drawing is filled in a position in which the sketch drawing is arranged in the template. If the size is not matched, the sketch drawing is scaled up or down or trimmed in any range until the drawing fits in place.

When the member drawing is inputted, based on the position information on the sketch drawing corresponding to each member drawing, the position information on each inspection object member on the sketch drawing is filled in the template. The position information is expressed by XY coordinate information on the sketch drawing or alternative information such as a baseline number.

The inspection content is also filled in a position in which the inspection content is arranged in the template. However, if the inspection content is contained in the member drawing, this process can be omitted. The data format of the drawing information is converted to a format (e.g., GIF (graphics interchange format)) displayable on the mobile terminal 3 before being filled in the template.

The server 1 stores the generated inspection sheet in the DB 1a.

Note that the above generation program may be executed not by the server 1, but by the PC 2. Instead of the server 1, the PC 2 may generate the inspection sheet. If the template is in the server 1, the PC 2 requests the server 1 to send the template. When the template is received, the PC 2 fills the inputted inspection information and the like in the template. The inspection sheet generated by the PC 2 is sent to the server 1 and is stored in the DB 1a.

Then, the server 1 treats the template with the inspection information and the inspection drawing filled therein as the inspection sheet.

The layout of the inspection information and the inspection drawing is specified by the template, but the display layout of the mobile terminal 3 and the print layout of the printer 4 connected to the PC 2 may also be specified by the template. Alternatively, the display layout of the mobile terminal 3 and the print layout of the printer 4 may be determined by an application of the mobile terminal 3 and the printer 4 respectively.

For the purpose of allowing the user to confirm the content of the generated inspection sheet (without inspection result filled therein), the server 1 may convert the generated inspection sheet to print data printable by the printer 4 to output the print data to the printer 4 and instruct the printer 4 to print the inspection sheet.

Moreover, the server 1 may allow the content of the generated inspection sheet to be viewed by a user of the PC 2 or the mobile terminal 3 who is logged on to the server 1 under an account of administrator privileges such as a construction site supervisor; as well as accepts an input of acknowledgment or no acknowledgment; if acknowledgment is inputted, the inspection sheet is stored in the DB 1a and if no acknowledgment is inputted, the inspection sheet is not stored in the DB 1a.

Figure 5:
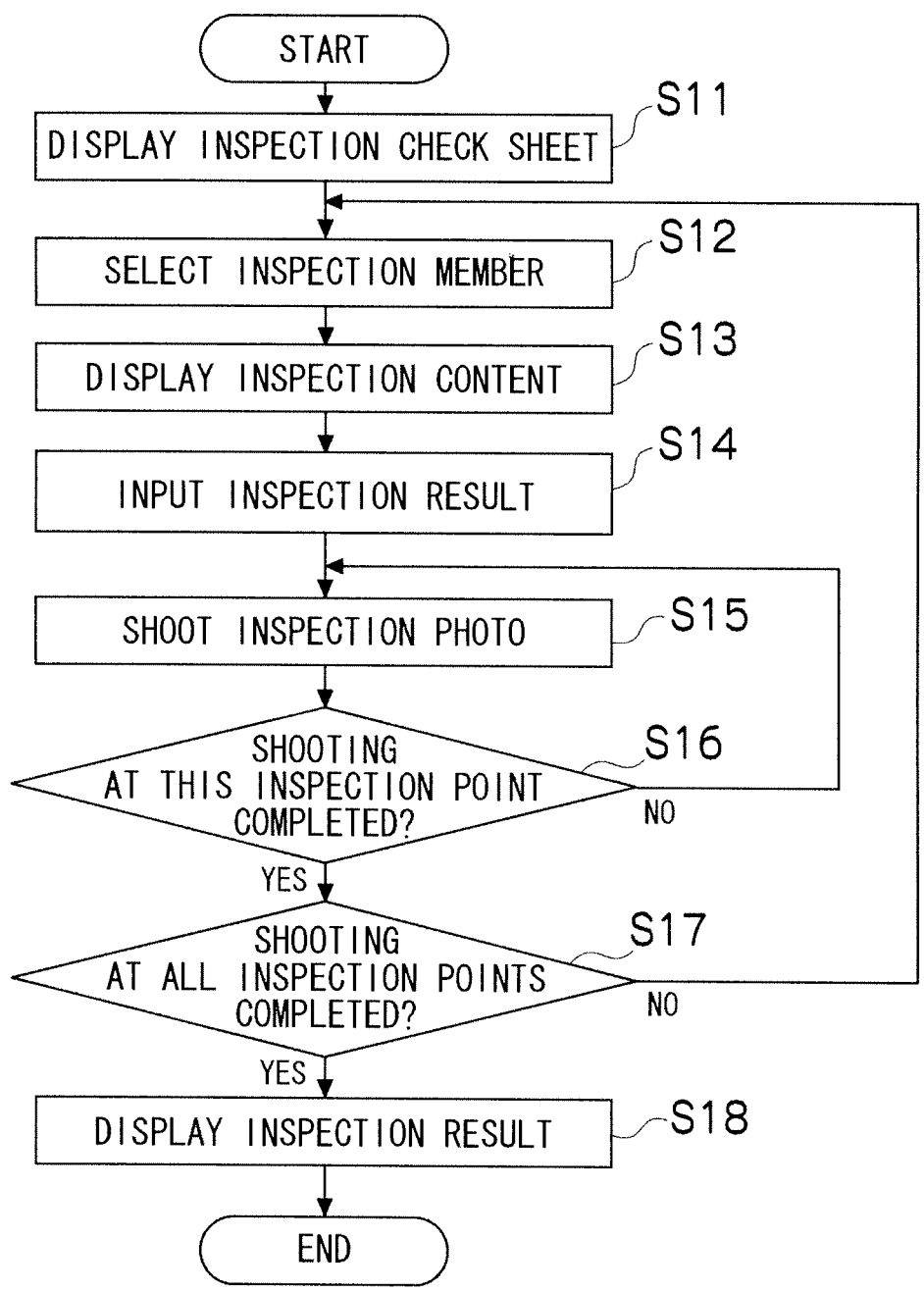
FIG. 5 is a flowchart of an inspection work process.

FIG. 5 illustrates a flowchart of an inspection work process. The program for causing the server 1 and the mobile terminal 3 to execute this process is stored in a storage medium of the server 1 and the mobile terminal 3.

In step S11, the user logs in from the mobile terminal 3 to the server 1 under inspector privileges and instructs to start the inspection process. At this time, it is assumed that the inspector carries the mobile terminal 3 to the inspection site. When an instruction to start the inspection process is received from the mobile terminal 3, the server 1 opens an inspection sheet stored in the DB 1a and sends the inspection sheet to the mobile terminal 3. If a plurality of inspection sheets is stored in the DB 1a, the server 1 sends the inspection sheet selected from the mobile terminal 3. Alternatively, the server 1 associates the inspection sheet with the inspection implementation date before storing the inspection sheet in the DB 1a and sends, to the mobile terminal 3, the inspection sheet corresponding to the same or most recent inspection implementation date when an instruction to start the inspection process is received from the mobile terminal 3.

Moreover, the server 1 may add the name of a logged-in inspector and the inspection date to the inspection information filled in the inspection sheet. The inspection date may be replaced with the access date, and the name of a logged-in inspector may be replaced with the name of a logged-in user.

The server 1 can receive various data from the mobile terminal 3 and associate the data with the opened inspection sheet before storing the inspection sheet in the DB 1a. Data may be sent from the mobile terminal 3 to the server 1 at any timing. Data may be sent from the mobile terminal 3 to the server 1 at any timing, such as each time the data is inputted from the mobile terminal 3, or data may be sent collectively at a specific timing such as when the inspection process ends.

The mobile terminal 3 stores the inspection sheet received from the server 1 in a storage medium such as a RAM, converts the image data of the stored inspection sheet to a video signal, and displays the image on the image display apparatus 48. The inspection sheet may be displayed in any manner. For example, the inspection sheet may be displayed on a viewer screen displaying a framing plan in which an installation position of each inspection object member is displayed; or the inspection sheet may be displayed on a list screen on which inspection points are listed item by item; or further, the inspection sheet may be displayed on the viewer screen or the list screen alternately switched in response to an instruction to the operation apparatus.

FIG. 8 illustrates a display example of a viewer screen on which a framing plan contained in the inspection sheet received from the server 1 is displayed on the image display apparatus 48 of the mobile terminal 3.

In step S12, the mobile terminal 3 accepts a selection of the position of a desired inspection object member from the framing plan displayed on the image display apparatus 48. The selection may be made in any manner. For example, according to the pressing of an arrow key of the operation device 46, the cursor moves between the inspection object members arranged on the framing plan; and when the OK key is pressed at a desired cursor position, the inspection object member located at the cursor position is accordingly selected. Alternatively, the inspection object member may be selected by causing the inspector to press a numeric key corresponding to each inspection object member arranged on the framing plan. Still alternatively, the inspection object member may be selected by causing the inspector to touch a position in which a desired inspection object member is located, from among the positions in which inspection object members are located on the framing plan.

The inspection object member may be selected in any order from a plurality of inspection object members, but the order of selecting inspection object members may be preliminarily included in the inspection information, and only the selection according to the order may be accepted.

Figure 6:
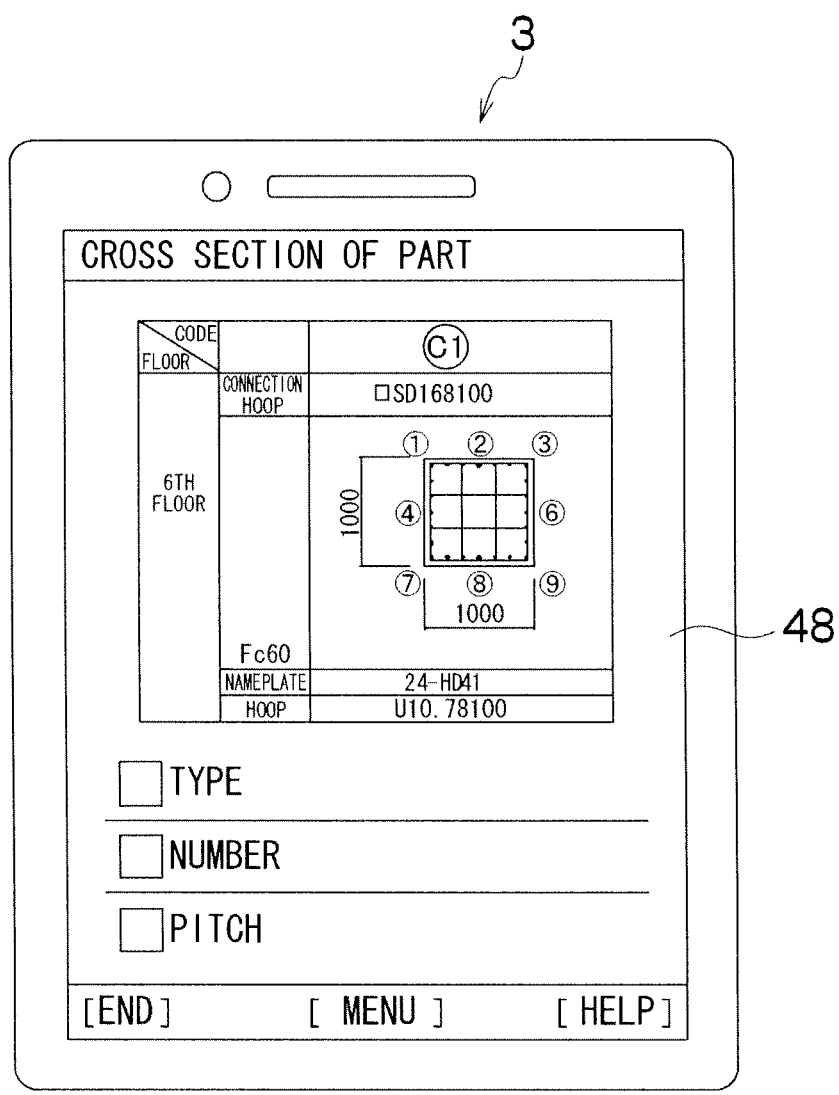
FIG. 6 is a display example of a member drawing.

In step S13, the mobile terminal 3 displays the inspection content corresponding to the selected inspection object member and the member drawing on the image display apparatus 48. FIG. 6 is an example of the display screen. On this screen, a sectional drawing illustrating a pillar member is displayed together with specific inspection items (the type, the number, and the pitch of the member). In addition, each inspection item has a check box which is displayed to allow OK or NG to be inputted. Moreover, a pattern of inspection points corresponding to the selected inspection object member, here, any one of the inspection points 1 to 9 each indicating a shooting direction as viewing the pillar from the circumference of the horizontal section of the pillar can be selected with the arrow keys of the operation device 46 or by pressing on a touch panel (not illustrated). The inspection points are not limited to the illustrated inspection points. For example, if the inspection object member is a wall, a desired surface can be made to be selected from the three surfaces: the left-side surface, the central surface, and the right-side surface. The inspection points may be displayed with different colors each indicating the points which have been inspected, the points which are not inspected, and the points which are being inspected. For example, the points which have been inspected are displayed in blue, the points which are not inspected are displayed in red, and the points which are being inspected are displayed in yellow.

In step S14, the mobile terminal 3 accepts a selection of an inspection point and an input of an inspection result through the operation device 46. On the screen of FIG. 6, the mobile terminal 3 accepts a selection input of any one of the inspection points 1 to 9 and an input of a check indicating whether the type, the number, the pitch of the member is OK or NG. In addition, the inspection result may be inputted as text from the operation apparatus, or a voice memo function of the mobile terminal 3 may be used to input the content of the inspection result or the repair instruction with a spoken voice of the inspector.

In step S15, the mobile terminal 3 accepts an instruction to shoot an image assuming the current state of the inspection object member viewed from the selected inspection point as the object through the shooting button 44. Then, the mobile terminal 3 starts shooting according to the shooting instruction, and stores the shot image in the memory 38. Then, the mobile terminal 3 associates the inspection photo which is the stored image with the inspection sheet, the selected member, and the inspection point, and stores them in the memory 38 again.

In step S16, the mobile terminal 3 displays the obtained inspection photo on the image display apparatus 48, and accepts a selection of whether or not the inspection photo shooting is to be completed through the operation device 46. If a selection indicating that the inspection photo shooting is to be completed is inputted, the process moves to step S17; and if a selection indicating that the inspection photo shooting is not to be completed is inputted, the process returns to step S15 in which shooting restarts. The number of inspection photos corresponding to the same member and the same inspection point may be singular or plural. Note that inspection efficiency is higher by instructing the inspector to shoot an inspection photo corresponding to the same inspection point a plurality of times and then select only the necessary images than by instructing the inspector to repeat shooting an inspection photo one by one corresponding to each inspection point and visual checking.

In step S17, the mobile terminal 3 determines whether or not all inspection photo shootings corresponding to all inspection object members are completed according to whether or not the mobile terminal 3 accepts an acknowledgment input indicating whether or not the inputs of inspection results and the shootings of the inspection photos corresponding to all inspection object members are completed through the operation device 46. If a determination is made Yes, the process moves to step S18. If a determination is made No, the process returns to step S12, in which the inspection result and the inspection photo corresponding to each inspection point are obtained by repeating displaying the inspection content corresponding to the selected inspection point, inputting the inspection result, and shooting the inspection photo.

In step S18, the inspection result at each inspection point is displayed on the image display apparatus 48. The inspection result may be displayed in any format. Note that FIG. 5 illustrates that the inspection result display process is performed at the final process of this process, but the inspection result display process may be performed at any timing after the inspection starts. For example, the inspection result can be displayed each time an inspection photo shooting is completed at each inspection point. Alternatively, the status of inspection results completed up to now may be list-displayed according to an instruction from the user. At this time, if there is an inspection object member which does not complete an input of the inspection result and a shooting of the inspection photo, the mobile terminal 3 can specify the inspection point and display a message indicating that the inspection is not completed at the specified inspection point on the display screen or informing by voice so as to prevent inspection omission.

Alternatively, according to a message indicating that the shootings of the inspection photos corresponding to all inspection object members are completed, the mobile terminal 3 may send a mail message informing communication partners of a completion of the inspection to the preliminarily set communication partners (the server 1, the PC 2, and other mobile terminals 3). In particular, if an NG is inputted as the inspection result to an object member, the mobile terminal 3 may send a repair instruction, together with a set of the object member, the inspection point, the content of the inspection result, and the inspection photo corresponding to the inspection result of the NG, to the mobile terminal 3 and the PC 2 of a person in charge of the construction preliminarily specified by the operation device 46, with an email or other data communication.

Figure 7:
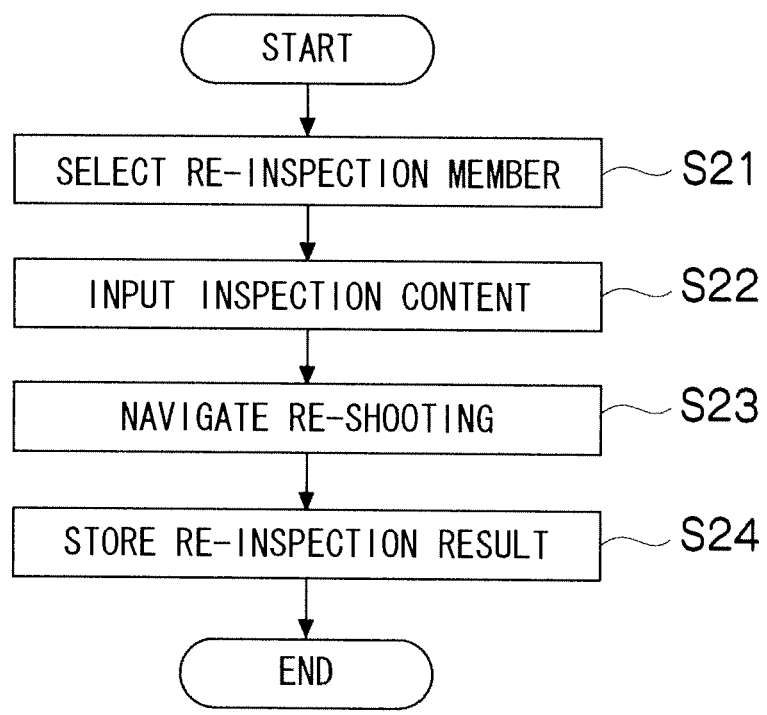
FIG. 7 is a flowchart of re-inspection process.

FIG. 7 illustrates a flowchart of re-inspection process. The program causing the mobile terminal 3 to execute this process is stored in a storage medium of the mobile terminal 3. This process can start if there is at least one inspection object member to which an NG is inputted as the inspection result. This process may start at any timing such as when an NG is inputted as the inspection result, or immediately after the inspection work process completes.

In step S21, the mobile terminal 3 accepts a selection of a desired inspection object member from the inspection object members to which an NG is inputted as the inspection result through the operation device 46. A graphic illustrating the inspection object members having an NG as the inspection result may be displayed on a framing plan of the image display apparatus 48. This process is the same as the above described process in step S12, but only the inspection object members having an NG as the inspection result can be selected. Thus, the process can assist a selection of an inspection object member by automatically displaying the inspection object members to be re-inspected.

In step S22, the mobile terminal 3 displays the member drawing and the inspection content corresponding to the selected inspection object member on the image display apparatus 48 and accepts a selection of the inspection point of the member drawing corresponding to the selected inspection object member through the operation device 46.

In step S23, the mobile terminal 3 accepts an input of the re-inspection result and an instruction to shoot the current state of the re-inspected member as the object through the operation device 46. Here, in order to easily compare the states before and after the repair by shooting the inspection photos with the same content (same position and same angle) as those of the previous inspection, the following process is performed. First, according to an instruction to start shooting, the previously shot inspection photo corresponding to the selected inspection object member is displayed by superposition on the image display apparatus 48 in such a manner that a through movie image is transmitted.

For example, first, basic composition information such as a contour, a structure line, and a vanishing point of the object is detected by edge detection or the like from the previous inspection photo. The basic composition information can be detected by a well known method. Then, information other than the basic composition information detected from the previous inspection photo is erased, and the intensity level of the remaining image information is set to a desired intensity level (e.g., 100) in a range from 0 to 255. By doing so, the basic composition information becomes translucent. This translucent basic composition information is superimposed on a through movie image. Here, further, the basic composition information is detected from the through movie image. Then, a guide video (an arrow icon indicating an angle-of-view adjustment direction so as to match both composition information or an icon indicating a zoom magnification on an indicator so as to match both composition information) is superimposed which instructs an angle-of-view adjustment so that the same composition information detected from the through movie image and the previous inspection photo is positioned on the same coordinate. This facilitates the angle-of-view adjustment for the inspector to shoot a re-inspection object member with the same composition as before.

Alternatively, the previous inspection photo and the through movie image may be display side-by-side vertically or horizontally (laterally) on the image display apparatus 48.

In step S24, the mobile terminal 3 associates the inspection sheet, the re-inspection result, and a newly shot inspection photo with each other and stores them in the memory 38. Note that the previous inspection photo may be erased. The stored inspection result and the inspection photo are associated with the user ID of the mobile terminal 3 and are sent to the server 1. When the inspection result and the inspection photo are received, the server 1 associates the inspection sheet, the inspection result, the inspection photo with each other and stores them in the DB 1a.

The server 1 may fill the inspection result and the inspection photo themselves or information (e.g., hyper link) substitute for the inspection result and the inspection photo in a template of the inspection sheet and may store an inspection report which is an inspection sheet having the inspection result and the inspection photo filled therein. For example, the server 1 may fill link information (e.g., URL) for accessing the inspection result and the inspection photo opened by a web server incorporated in the server 1 in a template of the inspection sheet sent to the mobile terminal 3 and may store the information.

The server 1 outputs the stored inspection report to outside through the printer 4, a display of the PC 2 or the image display apparatus 48 of the mobile terminal 3.

The inspection report may be outputted in any format. For example, the server 1 converts the inspection sheet of XML data reflecting the inspection result based on a predetermined layout conversion rule such as an XSLT (Extensible Stylesheet Language Transformations) to a layout in a form format or a screen display format and converts the inspection sheet to output data such as a PDF, and stores the output data. In response to a request from the PC 2, the server 1 sends the inspection report, which is layout output data, to the PC 2. The PC 2 sends the inspection report received from the server 1 to the printer 4 to be printed, or displays the inspection report on a display connected to the PC 2 or the image display apparatus 48 of the mobile terminal 3.

FIG. 9 is an example of an item of the template, the inspection sheet and the inspection report defined by XML tags. FIGS. 10 to 14 each shows a description of an item defined by XML tags.

The items of the template, the inspection sheet and the inspection report can be defined by XML tags. Examples of defined items include the type, the width, the height, the file name, the storage path, the coordinates of the inspection point, the inspection result corresponding to each inspection point, the ID number of inspection photo shooting point, the XY coordinates, the shooting direction, the position information on the drawing information associated with the inspection photo and the file name of the inspection photo, the storage destination path of the inspection photo, the shooting date, and the like, of the drawing information including the inspection type of the fixed-point inspection or any inspection, the original framing plan, the original sectional drawing, or the reduced image thereof.

The attributes "name", "floor", and "material" listed in FIG. 10 are inputted as basic information. A value indicating a fixed-point inspection which means an inspection to a preliminarily determined position (fixed point) such as reinforcement inspection or any point inspection which means an inspection to an object with an undetermined inspection place (any point) such as a utility pole and a plant can be inputted to the attribute "type". The attribute "type" may be inputted as the basic information. The attribute "status" is inputted from the mobile terminal 3 according to whether or not the inspection is performed and the result of the inspection.

The attribute "name" listed in FIG. 11 is a site name used as a part of the log-in information and is preliminarily registered in the server 1.

Each attribute listed in FIG. 12 indicates the coordinates of an inspection point, the baseline number of a member, the status, and the like. For any point inspection, the attribute of the baseline number of the member is not required.

Each attribute listed in FIG. 13 indicates the ID number of an inspection photo shooting point, the XY coordinates, the shooting direction, and the like. For any point inspection, the ID number is replaced with position coordinate information on the drawing information.

Each attribute listed in FIG. 14 indicates the ID information, the width, the height, the file name, the storage destination path, the shot date, and the like of an inspection photo. The inspection photo is shot by the mobile terminal 3.

The value corresponding to each attribute of each item defined by the tags in the inspection sheet is set according to the inspection result and the inspection photo acquired from the mobile terminal 3. The PC 2 displays a desired inspection place and the inspection photo and the inspection result corresponding thereto based on the inspection sheet on the inspection report generation screen (see FIG. 15). The PC 2 generates an inspection report associating the inspection result such as a desired inspection comment and a desired inspection photo with a desired inspection place on a framing plan on the inspection sheet selected through the screen. The PC 2 accepts an output or a print output of a file of the generated inspection report through the inspection report output screen (see FIG. 16).

FIG. 15 is an example of an inspection report generation screen.

As illustrated in FIG. 15, the inspection report generation screen includes an inspection point selection area Q1, an inspection point icon P1, an all inspection photo display area Q2, an inspection photo shooting count display area P2, an inspection photo list P3, an Add button P4, an inspection point detail display area Q3, an inspection photo enlarged display area Q4, an Add/Delete button P5, an inspection report generation area Q5, a for-report inspection photo list P6, a Delete button P7, and a Complete button P8.

The inspection point selection area Q1 is an area in which the framing plan (inspection map) and one or more inspection points corresponding thereto contained in the inspection data are displayed by the inspection point icon P1 and a desired inspection point is selected by clicking or the like from the inspection points displayed by the inspection point icon P1 corresponding to the inspection point.

The all inspection photo display area Q2 is an area in which, of the inspection photos acquired from the mobile terminal 3, all inspection photos associated with the inspection point selected in the inspection point selection area Q1 are displayed.

The inspection photo shooting count display area P2 is an area in which the number of all inspection photos associated with the inspection point selected in the inspection point selection area Q1 is displayed.

The inspection photo list P3 is an area in which all inspection photos associated with the inspection point selected in the inspection point selection area Q1 are displayed in list form.

The Add button P4 is a GUI for specifying an inspection photo to be included in or to be added to the inspection report, of the inspection photos displayed in the inspection photo list P3.

The inspection point detail display area Q3 is an area in which detail information associated with the inspection point selected in the inspection point selection area Q1 is displayed. The detail information can include inspection information such as an inspection point number contained in the inspection data, the inspection result and comment acquired from the mobile terminal 3, and the like.

The inspection photo enlarged display area Q4 is an area in which the inspection photo selected in the all inspection photo display area Q2 and the inspection report generation area Q5 is displayed.

When the inspection photo selected in the all inspection photo display area Q2 is displayed, the Add/Delete button P5 is a GUI (graphical user interface) for adding the inspection photo to the inspection report. When the inspection photo selected in the inspection report generation area Q5 is displayed, the Add/Delete button P5 is a GUI for deleting the inspection photo from the inspection report.

The inspection report generation area Q5 is an area in which the inspection photo to be included in the inspection report is determined.

The for-report inspection photo list P6 is an area in which the inspection photos to be included in the inspection report are displayed in list form.

The Delete button P7 is a button for deleting the inspection photo from the inspection report.

The Complete button P8 is a GUI for completing the generation of the inspection report and executing the registration and storage of the inspection report.

The user can select a desired inspection point, can select a desired inspection photo from all inspection photos corresponding to the selected inspection point, and can store the selected inspection photo and the inspection result corresponding to the inspection photo as the inspection report.

Conventionally, the user needs to select an inspection photo for the inspection report from a large number of inspection photos, and needs to manually perform a layout operation of associating the selected inspection photo with the inspection result using spread sheet software or the like. In contrast, the user can use this screen to select a desired inspection photo to be included in the inspection report from the inspection photos corresponding to a desired inspection point and can store the selected inspection photo, the inspection point information and the inspection result corresponding to the inspection photo as the inspection report.

FIG. 16 is an example of an inspection report output screen.

As illustrated in FIG. 16, the inspection report output screen includes an inspection report display area R1, a Paginate R2, an inspection report edit button R3, a file output button R4, and a print button R5. The inspection report display area R1 is an area in which the generated inspection report is displayed. The Paginate R2 is a GUI for accepting an instruction to display pagination when the generated inspection report extends beyond a page. The file output button R4 is a GUI for accepting an instruction to output the inspection report to a storage medium in a predetermined file format such as a spread sheet file format. At this time, a dialog box for specifying a file name and a file storage place is opened. A desired file name and file storage place can be specified in the dialog box. When storage is completed, editing the inspection report is disabled. The print button R5 is a GUI for accepting an instruction to execute printing of the inspection report.

As described above, the inspection system according to the present embodiment allows the inspector to specify a desired inspection point while viewing the framing plan and the member drawing included in the inspection report preliminarily generated by the PC 2 with the mobile terminal 3, shoot an inspection photo corresponding to the specified inspection point with the mobile terminal 3, and store the inspected check sheet, which is data associating the inspection point with the inspection photo, in the server 1. The inspected check sheet stored in the server 1 can be converted to a form format to be printed or displayed. Therefore, a series of operations such as inspection sheet generation, inspection result input, inspection photo shooting, and form output can be easily performed using the server 1, the PC 2, and the mobile terminal 3. In particular, inspection point input, inspection result input, and inspection photo shooting or re-shooting can be performed using the mobile terminal 3, and thus portability and operability at an inspection site are high.

Figure 17A:
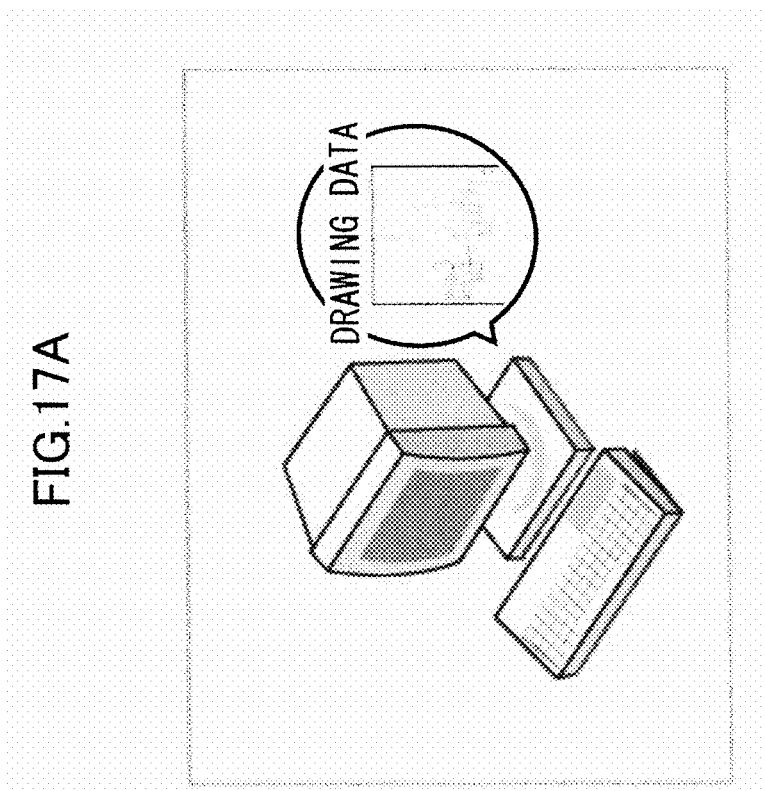
FIGS. 17A and 17B are schematic explanatory drawings of an example of application of this system (inspection at construction site)
Figure 17B:
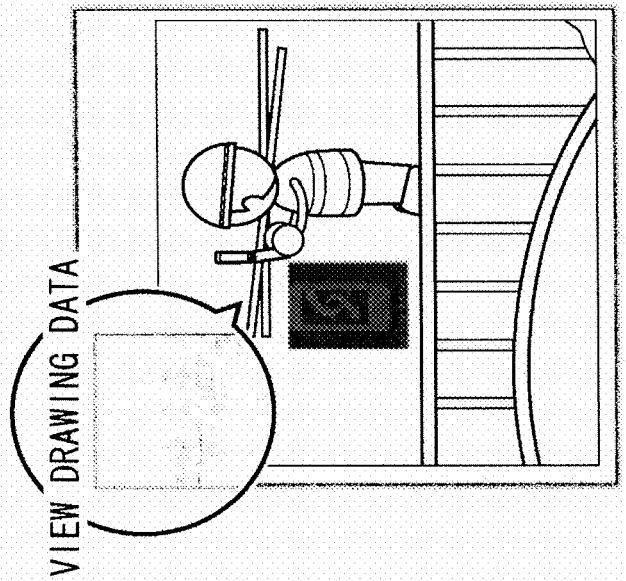
Figure 19C:
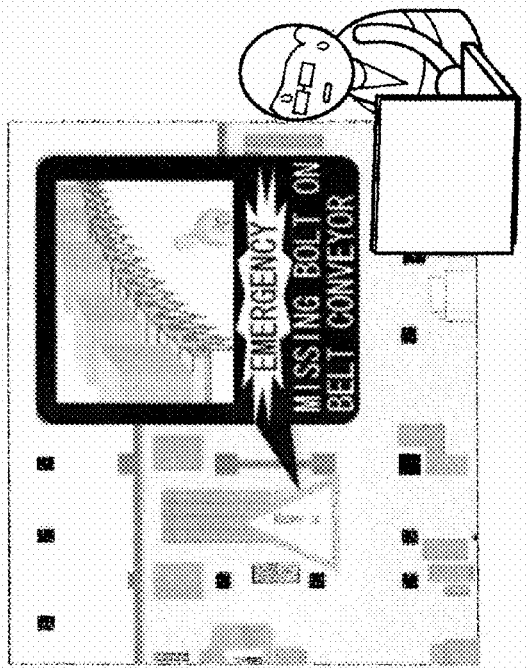
FIGS. 19A to 19C are schematic explanatory drawings of an example of application of this system (inspection and maintenance of a plant).
Figure 19B:
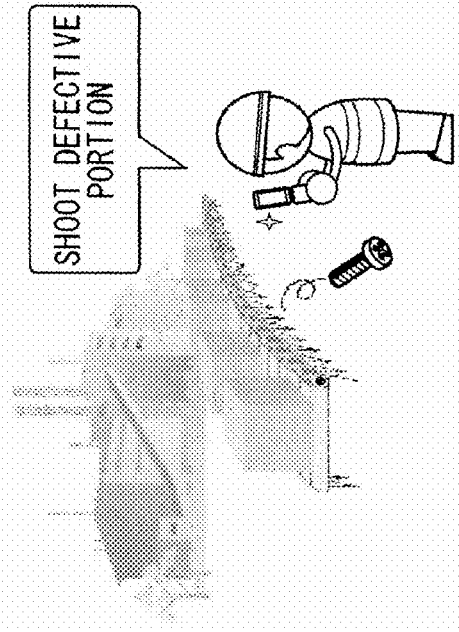
Figure 19A:
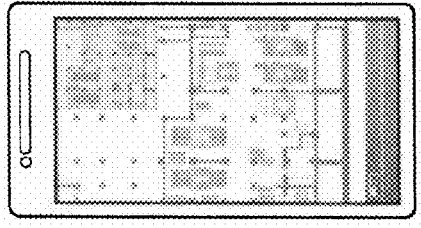

Note that this inspection system can be used in a wide range of applications such as confirmation of a drawing at inspection in a construction site (see FIG. 17), inspection and maintenance of a utility pole (see FIG. 18), and inspection and maintenance of a plant (see FIG. 19).

The presently disclosed subject matter can be provided as a computer-readable program code for causing a device (such as a mobile phone, a PDA, an electronic camera or a computer) to execute the above described process, a computer-readable recording medium on which the computer-readable program code is stored or a computer program product including the computer-readable program code.

What is claimed is:

1. An inspection system comprising:
   an inspection sheet generation apparatus; and
   a mobile terminal,
   the inspection sheet generation apparatus including:
   an inspection content input unit which inputs inspection information on an inspection object and inspection content and drawing information on the inspection information; and
   an inspection sheet generation unit which generates an inspection sheet based on the inspection information and the drawing information inputted by the inspection content input unit, and
   the mobile terminal including:
   a display unit which displays the inspection information and the drawing information based on the inspection sheet generated by the inspection sheet generation unit;
   an inspection object selection unit which selects a desired inspection object from the inspection objects contained in the inspection sheet according to the drawing information displayed on the display unit;
   an inspection result input unit which inputs an inspection result corresponding to the inspection content of the inspection object selected by the inspection object selection unit;
   a shooting point input unit which inputs a shooting point of the inspection object selected by the inspection object selection unit;
   a shooting unit which can shoot an image by using the inspection object as an object to be shot; and
   a storage unit which stores inspection result data associating the inspection object selected by the inspection object selection unit, the inspection result inputted by the inspection result input unit, the shooting point inputted by the shooting point input unit, and the inspection photo which comprises an image shot by the shooting unit, with each other,
   wherein the inspection sheet generation apparatus reads from a database a template defining an arrangement pattern and a display format of the drawing information based on the inspection information, and generates the inspection sheet by filling a value of an item corresponding to the inspection data in the template with data registered by the inspection content input unit,
   wherein no value of the inspection result and no inspection photo are preliminarily set in the template, and
   wherein the inspection result input unit sets the value of the inspection result and the inspection photo in the inspection sheet to store the inspection result data.

2. The inspection system according to claim 1, further comprising an output unit which outputs an inspection report converting inspection result data stored in the storage unit to a predetermined display format or form format.

3. The inspection system according to claim 1, further comprising a re-inspection unit which instructs a user of the mobile terminal to perform at least one of re-input of an inspection result and re-shooting of the inspection photo according to an inspection result contained in inspection result data stored in the storage unit.

4. The inspection system according to claim 3, wherein the re-inspection unit displays both an inspection photo contained in inspection result data stored in the storage unit and an angle-of-view confirmation image for confirming angle-of-view obtained from the shooting unit on the display unit.

5. The inspection system according to claim 1, further comprising a notification unit which notifies a predetermined communication device of the inspection result according to an inspection result contained in inspection result data stored in the storage unit.

6. The inspection system according to of claim 1, wherein
   the drawing information inputted by the inspection content input unit includes a sketch drawing and a member drawing of an inspection object to which position information on the sketch drawing is assigned,
   the inspection object selection unit selects an inspection object by specifying the position of an inspection object on the sketch drawing, and
   the display unit displays the member drawing of the inspection object selected by the inspection object selection unit.

7. The inspection system according to claim 6, wherein
   the inspection information inputted by the inspection content input unit includes a pattern of shooting points arranged on the member drawing, and
   the shooting point input unit inputs a shooting point by causing a desired shooting point to be selected from the pattern of shooting points arranged on the member drawing displayed by the display unit.

8. The inspection system according to claim 1, wherein the template includes a first, a second, a third, and a fourth link information.

9. The inspection system according to claim 1, wherein the template is prescribed by a markup language.

10. The inspection system according to claim 1, wherein no value of the inspection data is preliminarily set in the template, and
    wherein the inspection content input unit fills the value of the inspection data.

11. The inspection system according to claim 1, wherein the inspection sheet generation apparatus reads from the database the template corresponding to at least one of an inspection type and an inspection object member.

12. An inspection method comprising:
    inputting, by an inspection sheet generation apparatus, inspection information on an inspection object and inspection content and drawing information on the inspection information;
    generating an inspection sheet based on the inspection information and the drawing information input by the inputting inspection information;
    displaying, by a mobile terminal, the inspection information and the drawing information based on the generated inspection sheet;
    selecting a desired inspection object from the inspection objects contained in the inspection sheet according to the drawing information displayed;
    inputting an inspection result corresponding to the inspection content of the inspection object selected;
    inputting a shooting point of the inspection object selected;
    shooting an image by using the inspection object as an object to be shot; and
    storing inspection result data associating the inspection object selected, the inspection result inputted, the shooting point inputted, and the inspection photo which is the image shot, with each other,
    wherein the generating reads from a database a template defining an arrangement pattern and a display format of the drawing information based on the inspection information, and generates the inspection sheet by filling a value of an item corresponding to the inspection data in the template with data registered by the inputting inspection information, wherein no value of the inspection result and no inspection photo are preliminarily set in the template, and wherein setting the value of the inspection result and the inspection photo in the inspection sheet to store the inspection result data.

13. The inspection method according to claim 12, wherein the template includes a first, a second, a third, and a fourth link information.

14. The inspection method according to claim 12, wherein the template is prescribed by a markup language.

15. The inspection method according to claim 12, wherein no value of the inspection data is preliminarily set in the template, and further comprising filling the value of the inspection data.

16. The inspection method according to claim 12, further comprising reading from the database the template corresponding to at least one of an inspection type and an inspection object member.

\* \* \* \* \*